United States Patent [19]

Werjefelt

[11] Patent Number: 4,832,287
[45] Date of Patent: May 23, 1989

[54] OPERATOR STATION EMERGENCY VISUAL ASSURANCE METHOD AND APPARATUS

[76] Inventor: Bertil Werjefelt, P.O. Box 1600, Kailua, Hi. 96734

[21] Appl. No.: 76,597

[22] Filed: Jul. 22, 1987

[51] Int. Cl.⁴ .......................................... B64D 11/00
[52] U.S. Cl. ................................... 244/118.5; 280/732
[58] Field of Search ................... 244/118.5, 121, 129.2; 169/50, 54; 128/200.28, 200.29, 205.26, 201.23, 201.25, 201.29; 340/705, 712; 280/732, 731; 296/21, 97 R, 84 M; 52/2

[56] References Cited

U.S. PATENT DOCUMENTS

| | | | |
|---|---|---|---|
| 3,614,129 | 10/1971 | Sobkow | 244/121 |
| 3,758,133 | 9/1973 | Okada | 244/121 |
| 3,768,467 | 10/1973 | Jennings | 128/205.26 |
| 3,881,478 | 5/1975 | Rosendahl | 128/200.28 |
| 4,304,224 | 12/1981 | Fortney | 128/201.29 |
| 4,508,115 | 4/1985 | Warncke | 128/201.23 |
| 4,552,140 | 11/1985 | Cowley | 128/204.25 |
| 4,552,325 | 11/1985 | Bruensicke | 244/118.5 |
| 4,559,939 | 12/1985 | Levine | 128/201.28 |
| 4,683,880 | 8/1987 | Werjefelt | 128/201.23 |
| 4,710,756 | 12/1987 | Thornburg | 128/201.23 |

FOREIGN PATENT DOCUMENTS

| | | | |
|---|---|---|---|
| 2058832 | 5/1971 | France | 169/49 |
| 2086731 | 5/1982 | United Kingdom | 128/200.28 |
| 2118039 | 10/1983 | United Kingdom | 169/49 |

*Primary Examiner*—Galen Barefoot
*Attorney, Agent, or Firm*—Shlesinger, Arkwright & Garvey

[57] ABSTRACT

The invention includes an operator station emergency visual assurance system for providing the operator with substantially uninterrupted access to operationally necessary visual information under emergency conditions of a progressive invasion by heavy smoke and/or particulate matter toward and/or into the space between the source of said visual information and the operator. The system includes a station with a source of visual information. An operator position is provided spaced from said source of visual information with positionable means for providing a clear path of visibility between said source of visual information and the operator when in the operator position, when the positionable means is positioned between the source of visual information and the operator. The invention also includes the method of utilizing the system.

68 Claims, 5 Drawing Sheets

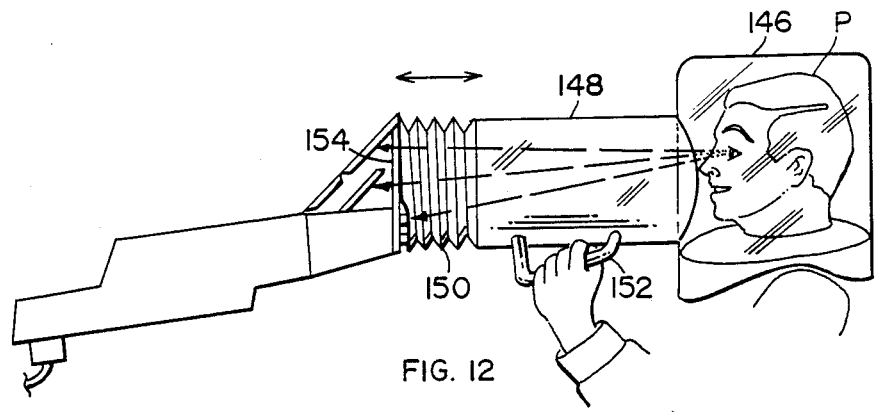
FIG. 12
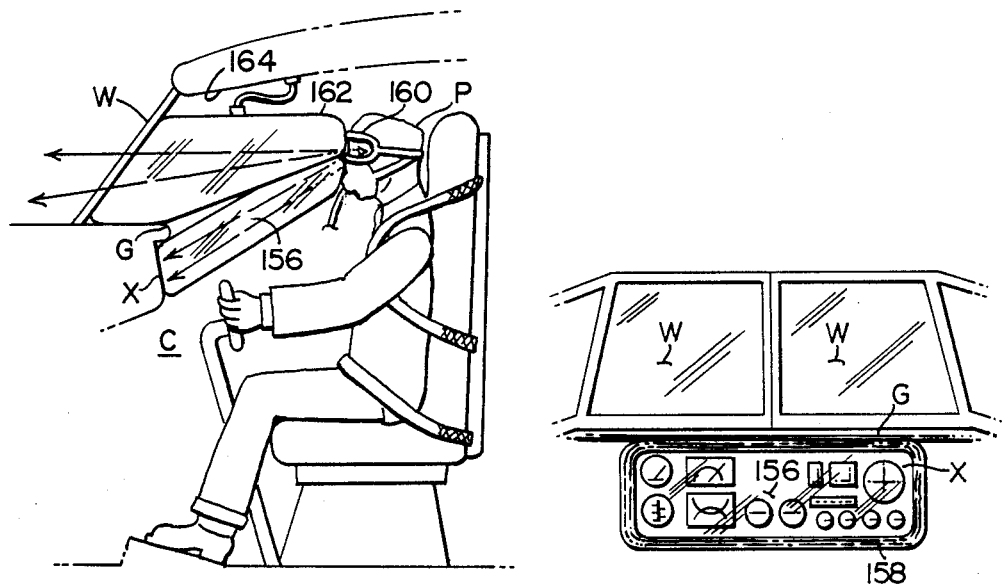
FIG. 14
FIG. 13
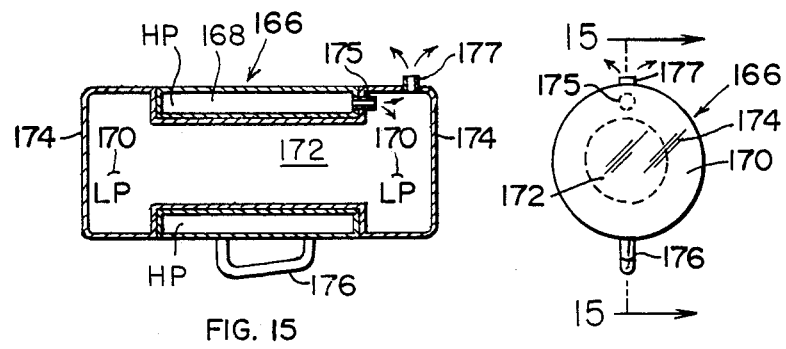
FIG. 15
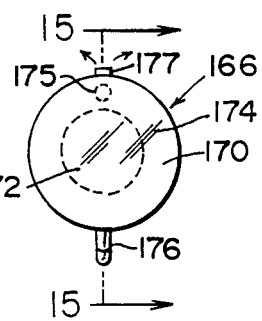
FIG. 16

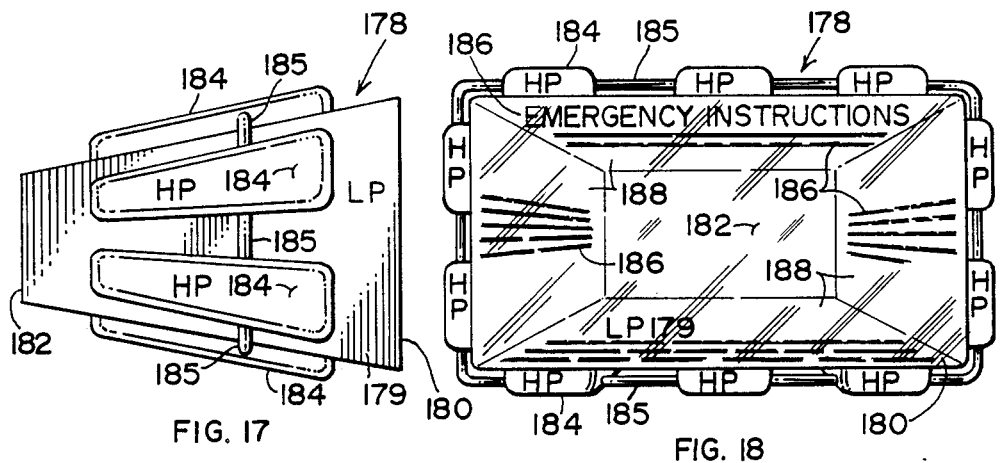
FIG. 17
FIG. 18
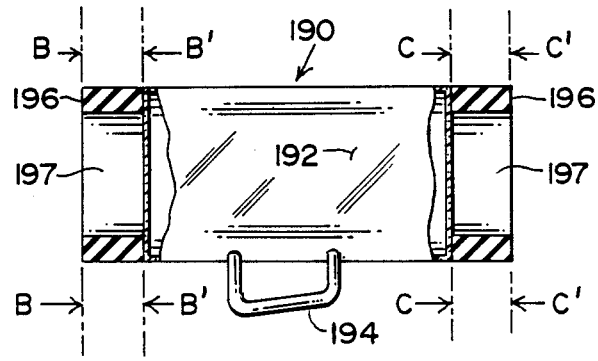
FIG. 19
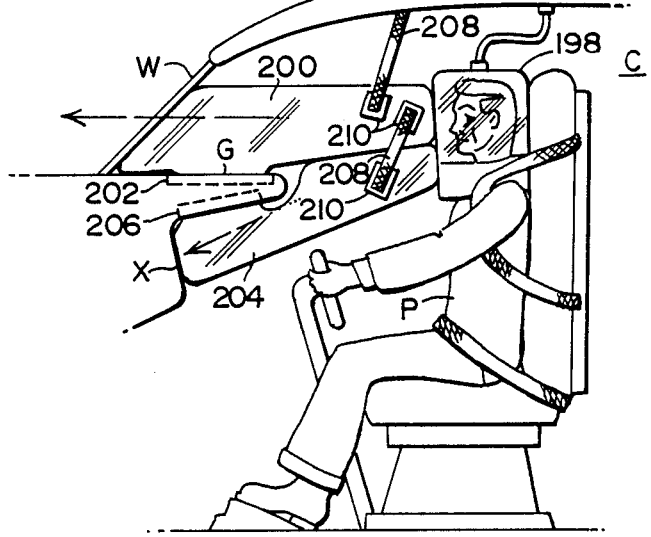
FIG. 20

OPERATOR STATION EMERGENCY VISUAL ASSURANCE METHOD AND APPARATUS

THE FIELD OF INVENTION

This invention primarily concerns the safe piloting of aircraft after smoke and/or particulate matter from an on-board in-flight fire invades the cockpit area of the aircraft. The invention can be an invaluable tool for a pilot in maintaining control of an aircraft for a safe landing under conditions where this has not been previously possible.

This invention relates to an operator station emergency visual assurance system for providing the operator with substantially uninterrupted access to operationally necessary visual information under emergency conditions of a progressive invasion by heavy smoke and/or particulate matter toward and/or into the space between the source of said visual information and the operator.

It is also considered to be significant to note that this invention is applicable to emergency conditions other than smoke and/or particulate matter emanating from fires. In fact it can be used to counteract any vision impeding fluid emergency conditions, including liquids, gases and vapors, and combinations thereof and therewith of suspended particulate matter. Furthermore, the invention may be used with or without life support means, such as oxygen mask and/or eye shielding means, depending on whether the vision impeding emergency conditions consist of an air blocking, noxious, toxic or physically irritating form of liquid, fluid, vapor or particulate matter, such as water, whether turbid with suspended sediments therein, brackish or clear, or smoke from a fire, or a non-noxious, non-toxic or non-physically irritating vision impeding vapor or particulate matter, such as mist, fog, snow, or fine airborne dust or sand, etc., that can infiltrate and/or flood a work area or station, or is present at the operational locale of rescue vehicles, etc. Moreover, it is contemplated that the operator could be a diver accessing material under water.

Accordingly, for the purpose of this application, the phrase "heavy smoke and/or particulate matter" is intended to include all forms of vision impeding fluids, vapors and airborne particulate matter.

HISTORICAL BACKGROUND

A continuing concern of Civil and Military Aviation Authorities, as well as certain Military Group Transportation Authorities, is to ensure that the operators of air planes, ships, and certain vehicles, in the event of emergencies where substantial visual impairment is caused by smoke or other airborne particulate matter in their confined environments, will have sufficient visibility of vital instruments and the external environment, in order to safely land an aircraft or continue to drive a tank or personnel carrier.

To counteract the adverse lacrymatory effects of smoke and toxic fumes pilots, for instance, are provided with goggles and, for respiratory protection, 100% oxygen is also available. This has been the case for approximately the last four decades. In addition, in order to try to provide visual assurance for the pilot to view instruments and be able to see outside the aircraft through the windshield (and for health and comfort reasons, also) fresh air ventilation rates in the cockpits of aircraft (civil transport carriers) have since the early 1950's been on the order of a minimum of 60 cubic feet per person per minute. On the most recently certified aircraft types presently in operation, the fresh air ventilation rates have been increased to approximately 250 cubic feet per person per minute in order to cope with the additional heat loads from electronic equipment and as what really amounts to only a token effort to aid in smoke evacuation during an emergency.

In spite of the long standing problems associated with inflight smoke and fire emergencies (according to FAA records there are more than 600 occurrences annually in this country alone . . . for a fleet of approximately 3,000 aircraft) the present procedures of evacuating and/or diluting the smoke are totally inadequate. This fact is best evidenced by the certification procedure applied by manufacturers and the FAA whereby only a finite amount of smoke is inserted in the cockpit and then shown to be evacuated, as opposed to a constant source of smoke, which would reflect a real life scenario. Even more important is the simple fact that tragedies with substantial loss of life are still occurring on a regular basis in situations where the only substantive cause for the tragedies is the loss of visibility of the instruments and/or external visibility from the aircraft.

A need therefore exists for the provision of pilot visibility of instruments, and visibility through the windshield, no matter how much and how dense the smoke may be in the cockpit.

There are a number of patented prior art devices which, in addition to providing a transparent protective enclosure for the head or face of a person in a hostile environment, are otherwise limited in purpose to only supplying the person with life supporting fresh air or oxygen. Examples of these patented devices are shown in U.S. Pat. Nos. 2,032,101 to Sullivan; 4,221,216 to Kranz; 4,236,514 to Moretti; 4,452,240 also to Moretti; 4,508,115 to Warncke; 4,552,140 to Cowley; and 4,559,939 to Levine. The devices of Warncke, Kranz, Moretti '240, Cowley and Levine have their own supply of air or oxygen from containers mounted on the head enclosures or strapped to the body of the wearer. The hoods of both of the Moretti patents as well as the hoods of Kranz, Warncke, Cowley and Levine are also inflatable. The hood of Warncke deploys out of the rim of the helmet shown in the patent. The device of the Levine patent is for aircraft passengers.

There are also a number of patented prior art emergency devices which go beyond a mere protective enclosure for the head or face of a person in a hostile environment. Examples of such patents are U.S. Pat. Nos. 2,960,292 to Pitta; 3,768,467 to Jennings; 3,911,913 to June; 4,523,588 to Dolsky; and British Patent No. 2,086,731 to Edwards.

OBJECTS OF THE INVENTION

The primary object of this invention is to provide for a clear path of visibility at all times between a pilot and the sources of visual information he relies upon for safe operation of his aircraft. These relied upon sources of visual information in an aircraft are primarily the view of the outside as seen through the windshield of the aircraft, and the pilot's instrument panel, below the windshield.

Vision-wise, the ultimate flying conditions for an aircraft are clear weather outside the aircraft and a clear environment inside the aircraft. In such conditions, the pilot can rely on both his view of outside conditions, landmarks, and aircraft orientation, as seen through the windshield, and readings of his instruments for safe operation of the aircraft. If conditions are such that there is no visibility outside the aircraft, but there is a clear environment inside the aircraft, the pilot must rely solely on his instruments. In most modern aircraft these instruments are more than adequate for safe operation and landing of the aircraft under such conditions. However, an adverse condition is when the cockpit environment is invaded by heavy smoke and/or particulate matter in the form of soot, etc., from an onboard fire in the aircraft which totally obscures the path of visibility between the pilot and these sources of necessary information for safe operation of the aircraft. In many instances in the past and in recent times, just a few more minutes of safe operation of an aircraft, after an outburst of fire on an aircraft shortly after takeoff or just before landing, could have resulted in the safe landing of the aircraft rather than a crash. It is therefore an object of this invention to provide a quick response means to overcome a sudden invasion of the pilot's visibility by particulate matter or the like.

A further object of this invention is to provide an additional source of pilot instrumentation readily movable and positionable before the pilot in a manner unobstructed from his view during heavy smoke conditions or the like.

One of the specific objects of the present invention is to either preclude smoke and/or particulate matter from entering the visual path between the pilot and his sources of necessary visual information or, in situations where smoke and/or particulate matter have already invaded this path, to displace such smoke and/or particulate matter from said visual path, thus assuring the provision of a clear path of visibility between the source of visual information and the pilot under such emergency conditions.

Another object of the present invention is to provide a clear path of visibility means system comprising a variety of forms of separate units which may be used either individually or in coordination with one another to satisfy the clear path of visibility needs of the many types of very small to very large aircraft that are presently in existence and do not have such a heavy smoke and/or particulate matter visual assurance emergency system.

A further object of this invention is to provide clear path of visibility systems for new aircraft during their design stage, so that the system can be built-in to aircraft cockpits during their manufacture for automatic deployment into operative position upon the sensing of the onset of emergency conditions.

Another object of the present invention is to provide a clear path of visibility means which can be manually placed into position by the pilot upon his receiving a signal from a smoke detector at the onset of emergency conditions.

A further object of the invention is to provide aircraft pilots an emergency visual assurance system which is light in weight and stores compactly when not in use, yet can be readily deployed either manually, or automatically, to preempt or displace large volumes of smoke and/or particulate matter from the visual path between the pilot and necessary visual information.

Another object of the invention is to provide aircraft pilots an emergency visual assurance system which is fast, easy to operate, positive acting, efficient and reliable.

Other and more specific objects of the invention will become evident upon reading the full description of the invention which will be given herein below.

SUMMARY OF THE INVENTION

In accordance with the above recited objects, the present invention contemplates the use of a variety of forms of sealed transparent chambers and bag-like enclosures which may be expanded or inflated to completely fill so much of the space between an aircraft pilot and his ordinary source of necessary visual information, or any alternative substitutable auxiliary source, as includes the visual path between the pilot and such source of necessary visual information, for assuring said operator substantially uninterrupted access to such source of visual information under emergency conditions of a progressive invasion by heavy smoke and/or particulate matter toward and/or into the space between such sources of visual information and the pilot.

The various forms of sealed transparent expansible chambers and inflatable bag-like enclosures shown can be used either individually or in combinations tailored to the needs of different types of aircraft. For older, and especially smaller aircraft, appropriate standard sizes of a given type of portable transparent sealed chamber or bag-like enclosure or a combination of types of portable transparent sealed chamber and/or bag-like enclosures may be tailored to the needs of such aircraft. For new aircraft, whole emergency visual assurance systems, including storage means, smoke and/or particulate matter emergency sensing and signaling means, and automatic deployment means may be custom designed for and permanently installed on all planes produced of any given model of aircraft.

When the present invention is used in an aircraft to counter emergency conditions of heavy smoke and/or particulate matter from an onboard fire, life support means for the pilot are used to protect the pilot from the toxicity of such conditions. In connection with some modifications of the invention separate and independent life support means are used. In connection with other modifications of the invention, life support means built into various parts of the emergency visual assurance system itself are used.

DESCRIPTION OF THE DRAWINGS

FIG. 12 shows a modified hood unit which has integrally attached thereto a forward extension which is in open communication with the inner space of the hood, the end of the extension remote from the hood being made of resilient material for adapting this form of visual assurance unit to a range of lengths response to various inflation pressures.

FIG. 13 shows another form of visual assurance unit which is mounted over and sealed about the periphery of the instrument panel so that the instrument panel is totally enveloped within and protected by the bag in both the stored and deployed positions of said bag.

FIG. 14 shows the instrument panel unit of FIG. 13 in use together with a cooperating windshield unit.

FIGS. 15 and 16. FIG. 15 is a longitudinal cross-section along the line 15—15 of the hand-held visual assurance unit shown in end view in FIG. 16. This unit comprises high pressure and low pressure chambers.

FIG. 17 shows another form of visual assurance unit employing both high pressure and low pressure chambers.

FIG. 18 is a right-hand end view of the high pressure/low pressure chamber visual assurance unit shown in FIG. 17. FIG. 18 additionally shows how printed material comprising pilot emergency procedures can be placed on the forward converging walls of the low pressure chamber so as to be viewable by the pilot, navigator or engineer during emergency use of the unit.

FIG. 19 shows a longitudinal cross-section of yet another hand-held visual assurance unit which is provided at both ends with peripheral rings of soft spongy material for sealing over and around irregularities, such as knobs, etc., on the surface of an instrument panel, and the facial features or oxygen mask, etc., of the pilot.

FIG. 20 shows a special built-in arrangement of cooperating windshield and instrument panel visual assurance units.

DESCRIPTION OF THE INVENTION

Figure 1:
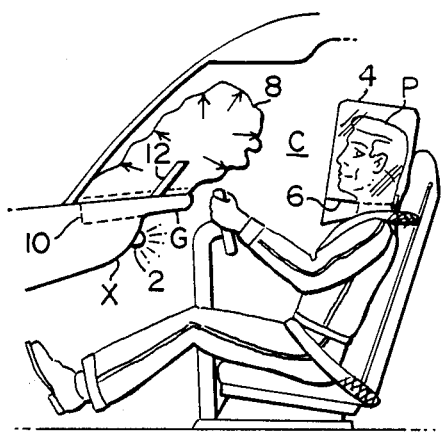
FIG. 1 is a fragmentary schematic which shows a pilot in a cockpit with headgear in place and a transparent visual assurance unit beginning to inflate.
Figure 2:
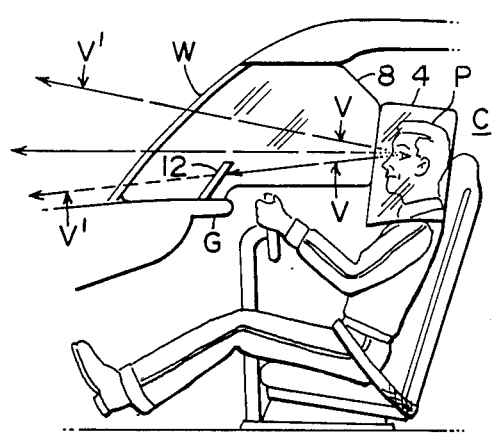
FIG. 2 shows the visual assurance unit in inflated position against the windshield and the pilot's headgear, which is in the form of a transparent oxygen hood which also serves as part of the visual assurance system.

FIGS. 1 and 2

FIG. 1 shows a fragmentary view of the cockpit C of an aircraft utilizing the present invention. The pilot P in response to a flashing light and/or audible signal from the fire warning indicator 2 on the instrument panel X, indicating the onset of a progressive invasion by heavy smoke and/or particulate matter towards and/or into the cockpit area of the aircraft, has just finished putting on his transparent hood 4 which has an elastic lower wall 6 with a central hole therein so that the hood can be passed over the pilot's head and sealed around his neck. The inside of the hood 4 is supplied from an oxygen source (not shown) which may be clipped to the side wall of the cockpit under the instrument panel X. The hood 4 is connected to the oxygen source by well-known means (also not shown) consisting of a lead-in hose to the hood 4 which may be quick-coupled to a pressure regulator connected to an oxygen cylinder so that the hood 4 may be maintained at a pressure which is always compatible with the pressure of the ambient atmosphere in the cockpit C. The hood 4 may be inflatable, flexible or rigid, as desired.

At or about the same time the hood 4 is positioned, a transparent inflatable visual assurance unit 8 is either being automatically deployed and inflated out of a storage compartment 10 in the glareshield G, or the pilot has manually opened the storage compartment 10 and connected the transparent inflatable visual assurance unit 8 to a source of clear inflating gas to inflate the unit 8.

Mounted in the storage compartment 10, in addition to the visual assurance unit 8, is a head-up display unit (commonly called a HUD) 12 upon which can be electronically displayed, in known fashion, a minimum number of auxiliary piloting indicators such as: (a) a turn/bank indicator; (b) an altimeter; and (c) a pitch and yaw indicator. This HUD 12 may be made to be either automatically or manually deployed from the storage compartment 10 with the visual assurance unit 8, or can be rigidly mounted in the storage compartment 10 so as to stand up and out therefrom in both the stored and deployed conditions of the unit 8. In the latter case, in the stored condition of the visual assurance unit 8, a small part of the inner surface of the upper portion of the membrane of the visual assurance unit 8 will closely surround the upstanding HUD 12. Accordingly, whether the HUD 12 is mounted in fixed stand-up position in the storage compartment, or is mounted for pop-up deployment with the visual assurance unit 8 from the storage compartment 10, the HUD 12 will be totally enveloped within and protected by the visual assurance unit 8 from emergency conditions of smoke and/or particulate matter, in both the stored and deployed positions of said visual assurance unit 8.

In accordance with the present invention, static pressure gas-impermeable transparent film or a pressure positive system which permits slow leakage of the gas is used to construct the visual assurance unit containing the clean, clear, uncontaminated gas. Halon, $Co_2$, or other gas may be used which has fire extinguishing ability. These films can be of a wide variety of materials, for instance polymeric films, such as polyethylene, polypropylene, polythylene terephthalate, nylon, polyvinyl chloride, polyurethane, flouropolymers and polyimides. Films that are substantially optically clear and distortion free should be used. Furthermore, it is desired that the materials used be strong and durable yet foldable, non-creasing without cracking, thin for easy folding and compact storage, and lightweight for facile handling and without adding substantial weight to the plane. The material used for the pilot's hood 4 may be of a stiffer material than that of the other visual assurance units so that it will stay firmly in position on the pilot. The materials used should also be heat and char resistant. The visual assurance units 8, other than the hood unit 4, should be made of the most lightly elastic otherwise suitable material that is available, and only loosely inflated, so that they will gently and closely conform to and seal over all irregularities on the surfaces which they contact, so as to preempt and/or displace any smoke on such surfaces. The visual assurance unit 8 may also be constructed of a chemically formed foam, or other materials which are transparent, substantially optically distortion free, and compressible or pliable.

Since the bag-like visual assurance unit 8, when inflated, will still be very light and non-selfsupporting, it is desirable that some sort of cooperating fastening means (not shown) such as Velcro ® be used for anchoring the visual assurance unit 8 in desired positions. With Velcro fastening means one part of the fastener, say the hook pad, could be cemented to the unit while its cooperating loop pad could be cemented to an appropriate part of the cockpit ceiling, glareshield, etc., for example. Also, to accommodate situations where the unit is to be suspended some distance below the ceiling, for example, straps of any appropriate material having a continuous side of hooks could be cemented at one end to the unit and then hooked into the loops on the ceiling pad at an appropriate length along the strap from its connection to the unit. In like manner, loop pads could be fastened to the pilot's uniform or to a special vest that the pilot could put on in an emergency, or to the pilot's hood, for connective reception of hooks on other straps connected to the unit, for securely fastening the visual assurance unit 8 in a desired position in regard to the pilot. Other arrangements of Velcro fasteners, or similar acting clip fasteners, of known types, might also be used as desired for this purpose.

FIG. 2 shows the emergency visual assurance system of FIG. 1 fully deployed. The visual assurance unit 8 is in close sealing contact with the visual assurance hood 4, the two units having cooperated to preempt and/or displace smoke and/or particulate matter from the pilot's path of vision VV'—VV' to and through the windshield W and the HUD unit 12, so that the hood unit 4 and the glareshield unit 8 together have formed this invention's assured clear path of visibility between the pilot and his operationally necessary emergency sources of visual information.

Figure 3:
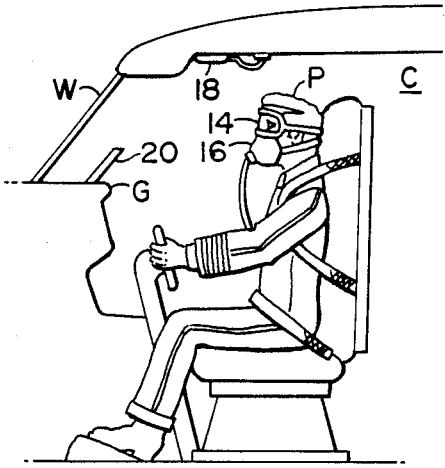
FIG. 3 shows a modified schematic in which the pilot has standard eye goggles and oxygen mask and the visual assurance unit and its automatic inflation mechanism are mounted in the cabin above the pilot's head.
Figure 4:
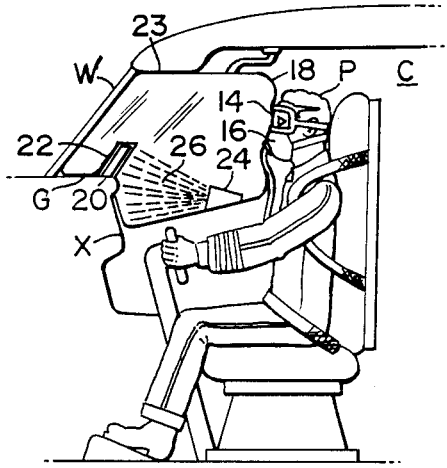
FIG. 4 is a view similar to FIG. 3 showing the visual assurance unit inflated against the pilot's goggles and the windshield, there being an auxiliary light source contained in the unit.

FIGS. 3 and 4

FIG. 3 shows a fragmentary view of the cockpit C of another aircraft utilizing the present invention. In this instance, the pilot P is wearing standard eye goggles and a standard oxygen mask 16. A single visual assurance unit 18 is mounted in stored position on the ceiling of the cockpit C for automatic deployment in the event of the onset of emergency conditions of heavy smoke and/or particulate matter from an onboard fire. A fixed position HUD unit 20 is mounted on the glareshield G.

FIG. 4 shows the emergency visual assurance system of FIG. 3 fully deployed. The visual assurance unit 18 is shown to be in close sealing contact with each of the pilot's eye goggles 14, the windshield W and down, over, and around the HUD unit 20 as shown as 22. Velcro ® or similar fastening means can be used to secure the unit 18 to each of the forward part of the ceiling at 23, the glareshield G, the instrument panel X, and to the pilot's clothing and equipment, as already explained in the discussion above in regard to the modification of the invention shown in FIGS. 1 and 2.

If desired, auxiliary emergency equipment may be stored within a visual assurance unit for deployment therewith. An example of this is shown in FIG. 4 where a light source, such as a battery operated emergency light 24, is shown as having been deployed with and within the visual assurance unit 18. The emergency light 24 is so arranged and associated with the unit 18 that it can be readily turned on by the pilot to cast its rays 26 at the instrument panel X. The HUD 20 is self-illuminated in the visual assurance unit 18.

A suitable gas source is also required for visual assurance units such as 18 shown in FIGS. 3 and 4. In the case of an aircraft this gas source can be the external air from the bleed air supply of the compressors which commonly are used for pressurization and ventilation of the aircraft, which external air can be filtered. Of course, any air used in the systems of this invention, whether from an air system designed solely for a visual assurance system of this invention, or from another air system or subsystem of the aircraft, and whether the air emanates originally from a source internal or external of the aircraft, may be filtered. The gas source can also be from a cylinder containing compressed gas or from a chemical gas generator, i.e., of the type commonly in use on aircraft for the provision of supplementary oxygen in the event of a decompression. Transparent gases of a non-flammable or fire retardant nature may also be used.

Since 90% of all aircraft fires occur in flight, where the ambient pressures may be on the order of 3-4 PSIA (static) and the pressure inside the cabin under normal pressurization is on the order of 9-11 PSIA it is important that the gas is supplied on a continuous or an intermittent basis, as required, during an emergency descent as the pressure in the cabin is then increasing and in the case of a bag-like visual assurance unit would cause it to collapse thereby impairing the intended function of same. When the invention uses a bag-like visual assurance unit, it is therefore desirable that the initial flow be relatively large for the purpose of inflating the bag, and that subsequently the supply be allowed to continue to trickle in. The ways of doing this are well known. It may in some instances, for the sake of simplicity and weight saving, be preferable to utilize a cintered metal plug in the orifice from the gas supply, thereby permitting the activation of the gas in one step where subsequently the gas is then exponentially expelled from the cylinder. The higher gas flow during the first phase of the activation will then accommodate the inflation of the bag, and the subsequent flow until the gas supply is depleted provides the desired continuous input to avoid deflation of the bag. The continuous inflow also eliminates the possibility of inward leakage of undesirable contaminants into the visual assurance unit. It is in light of the foregoing obvious that an outflow means for the gas shall also be provided from bag-type as well as non-inflated chamber types of visual assurance units.

FIG. 5

Figure 5:
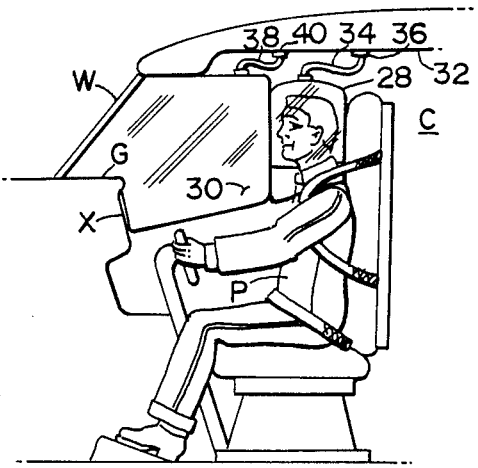
FIG. 5 is a modification of the system shown in FIGS. 3 and 4 and in which the pilot instead of having standard goggles and oxygen is utilizing a transparent protective breathing hood which can drop down from the cockpit ceiling, and which may provide air or oxygen as necessary.

The visual assurance system shown in FIG. 5 is similar to that shown in FIGS. 3 and 4 except that the pilot P instead of having standard eye goggles and a standard oxygen mask is utilizing a transparent visual assurance hood unit 28 which, similar to the visual assurance unit 30, is automatically deployed from storage on the ceiling 32 of the cockpit C, upon detection of smoke by smoke detector means on the aircraft.

The visual assurance units 28 and 30 may be deployed in any appropriate manner, such as oxygen and air supply masks which are now automatically deployed on commercial passenger aircraft. The visual assurance hood unit 28 is supplied with oxygen for both inflation and breathing purposes through the flexible hose 34 which is connected to the ceiling at 36 to a source of breathing oxygen similar to that available on commercial passenger aircraft. The visual assurance unit 30 is connected to the same source of oxygen, or another type of clear uncontaminated gas, through the flexible hose 38 which is connected to the ceiling of the cockpit at 40 to its source of gas under pressure regulation. The visual assurance units 28 and 30 otherwise operate in a similar manner to those already described and, when deployed as shown in FIG. 5, completely fill so much of the space between the pilot and his sources of necessary visual information, i.e., the windshield W and the instrument panel X, as comprises the visual path between the pilot and such sources of necessary visual information, thus assuring the pilot of the provision of a clear path of visibility between himself and his sources of visual information under emergency conditions of heavy smoke and/or particulate matter invading the cockpit.

The visual assurance units 28 and 30 may be repositioned into their storage compartments after use, or may be thrown away after use and eventually replaced, as appropriate, by new properly folded, packaged and security sealed and stored visual assurance units 28 and 30.

FIG. 6

Figure 6:
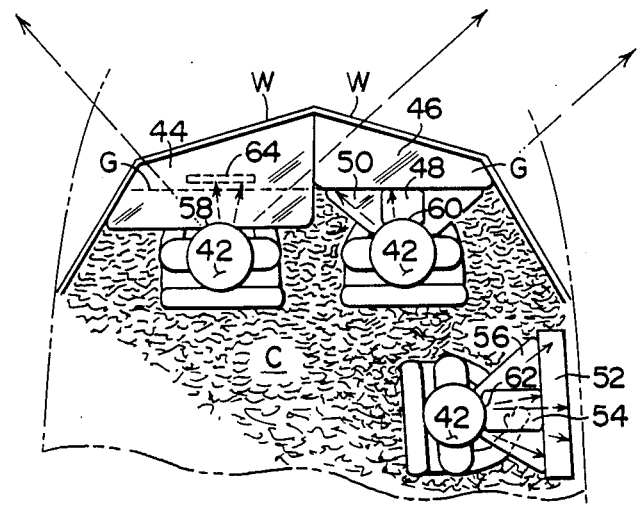
FIG. 6 is a top plan schematic showing various modifications of visual assurance units used in different positions and arrangements in a large aircraft in which all crew members are using transparent hoods.

While all three crew members shown are wearing similar visual assurance hood units 42, the other visual assurance units 44, 46, 48, 50, 52, 54, and 56 they are using may vary from station to station. FIG. 6 shows especially well how the firmer material of the hood units 42 projects into the various other units 44 through 56 which confront the hood units 42, and also how these other units closely adapt to and seal around the curved peripheries of the hood units 42, as shown for example at 58, 60, and 62, to preempt or displace smoke and/or particulate matter from the visual paths, shown by the many arrows in FIG. 6, between the crew members and necessary visual information.

At this point it is considered well to mention the dual capacity of the crew member's hood units 42, as both visual assurance units and as life support devices, where the visual impairment vapor involved is a toxic vapor such as smoke.

Figure 7:
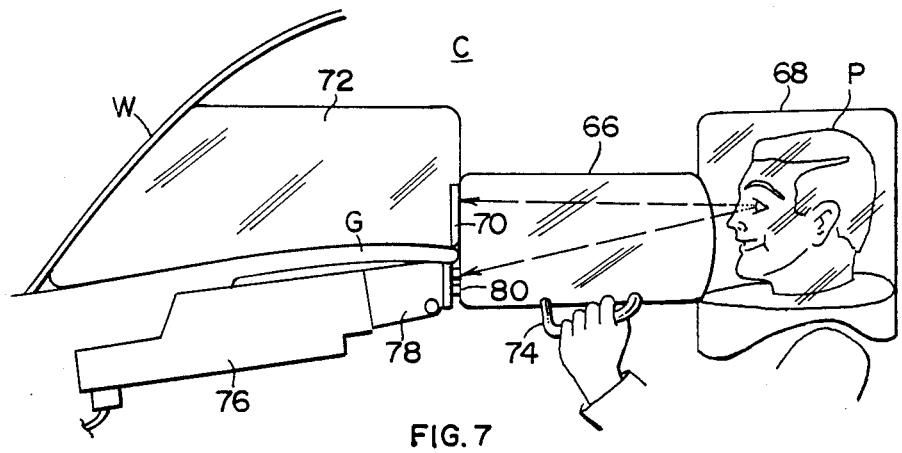
FIG. 7 is an enlarged schematic view of a modification of the invention employing a three unit system such as is illustrated on the right or co-pilot side of the cockpit shown in FIG. 6.

In the pilot's position at the left of FIG. 6 special note is made of the use of a HUD unit 64 on the glareshield G of the aircraft which is enveloped by the visual assurance unit 44 which is deployed between the windshield W and the glareshield G. In the co-pilot position at the right of FIG. 6 special note is made of the use of a visual assurance unit 46 between the windshield and the glareshield of the aircraft, a special hand-held visual assurance unit 48, which will be described more fully in regard to FIG. 7, shown being held between the unit 46 and the hood unit 42, and the lower visual assurance unit 50 which extends between the instrument panel and the co-pilot's hood unit 42. At the navigator or engineer station shown at the right rear of the cockpit C, note is made of the special rectangular-shaped upper visual assurance unit member 52, the hand-held visual assurance unit 54 which extends between the unit 52 and the navigator's or engineer's hood unit 52, and the lower visual assurance unit 54 which extends between a lower instrument panel and the navigator's hood unit 42.

FIG. 7

FIG. 7 illustrates in elevational view a three unit visual assurance system utilizing a hand-held visual assurance unit 66 for bridging the gap between the pilot's visual assurance hood unit 68 and both a HUD unit 70 and a visual assurance unit 72 that has been deployed between the windshield W and the glareshield G. The hand-held visual assurance unit 66 has a handle 74 which may be inflatable with the unit, or not, as desired.

FIG. 7 also shows a HUD Computer/Electronics unit 78 which has a controller 78 mounted under the glareshield G right under the HUD display screen 70. The HUD controller 78 is controlled by buttons 80 on the front of the controller and right under the HUD display screen 70. The pilot P can operate the HUD controller 78 by pressing appropriate buttons 80 to call up one or another of a number of auxiliary emergency instrument displays. To operate the buttons the pilot merely squeezes a finger between the hand-held unit 66 and the front of the controller 78 on which the buttons 80 are mounted. This system is especially adapted to cockpits for which a custom designed visual assurance system has not been provided and where separate standard sized visual assurance units, including a given standard sized hand-held unit, will adequately serve to completely fill the space between the pilot and his necessary sources of emergency visual information.

While life support means is not shown as being connected to the visual assurance hood means 68 shown in the system of FIG. 7, it is obvious that life support means could easily be connected thereto in a similar manner as discussed in connection with the system of FIGS. 1 and 2. Also, the system of FIG. 7 could equally well be used by a pilot using standard eye goggles and an oxygen mask in place of the visual assurance hood unit 68. In fact, it is desired that all of the visual assurance hood units shown in this application which do not show life support means connected thereto, be considered as adaptable to life support means such as described in connection with the modification shown in FIGS. 1 and 2.

The hand-held visual assurance unit 66 may also, like all other forms of visual assurance units, be equipped with Velcro ® connector means including extended strap means for connecting the hand-held unit to the other visual assurance units of the system, or parts of the cockpit C, as previously mentioned, for allowing the pilot P to have both hands free for other purposes.

FIG. 8

Figure 8:
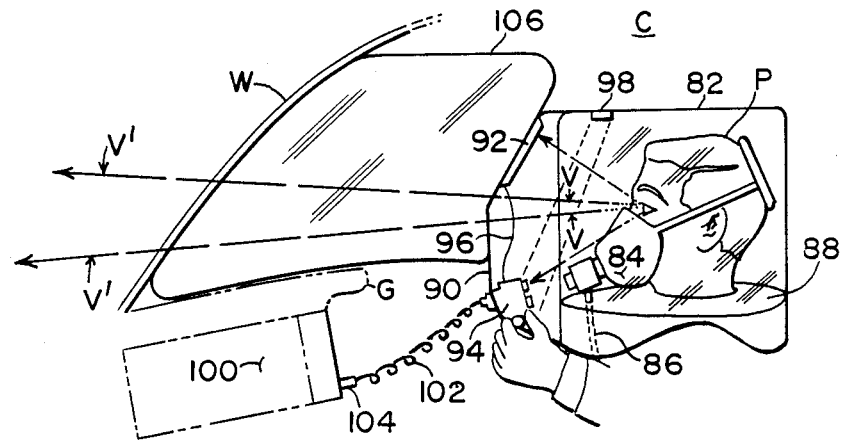
FIG. 8 shows a schematic view of a modification of the invention in which an auxiliary instrument system is shown in association with the pilot's oxygen hood.

FIG. 8 shows a modified type of visual assurance hood unit 82 which can be used with a separate oxygen mask 84. The pilot can secure the oxygen mask 84 on his head before donning the hood unit 82. The oxygen mask 84 is supplied with oxygen through a flexible hose 86 which passes through the elastic lower wall 88 of the hood unit 82. Mounted on the front of the hood unit 82 is a separate chamber 90 which is sealed to the hood unit 82 but is in open communication with the interior of the hood unit 82. Mounted in the chamber 90 at the upper front thereof is an LED or LCD display panel 92 which is electrically connected to the HUD control 94 by wire means 96. The HUD control 94 is also mounted inside the chamber 90 so that it is in the clear path of visibility of the hood and chamber combination 82, 90. Optionally, a light 98 may be mounted inside the top of the hood unit 82 and connected to a power source (not shown) for illuminating the HUD control unit 94. The portable HUD control unit 94 may be connected to the modified HUD computer/electronic unit 100 by the wiring 102 and its connecting plug 104. The emergency visual assurance system of FIG. 8 is completed by a visual assurance unit 106 which is deployed between the windshield W and the glareshield G of the aircraft. It is noted that the opaque LED or LCD display panel 92 is above the pilot's usual path of vision VV'—VV' to and through the windshield W.

In this modification of the invention, the hood 82 is made of a very sturdy plastic, as is the upper portion of the chamber 90. However, the lower portion of the chamber 90 is made of a softer and very pliable plastic which allows the pilot to manipulate the buttons on the HUD control unit 94 even though his hand is outside the sealed chamber 90.

Accordingly, the visual assurance unit 106 and the modified hood unit 82, 90 have been combined to completely fill the space between the pilot and his sources of necessary emergency visual information, so as to provide him with an assured clear path of visibility to such visual information.

FIG. 9

Figure 9:
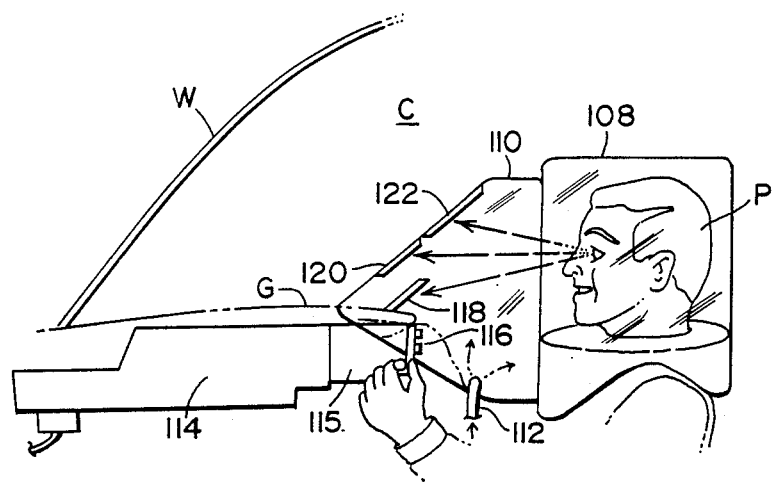
FIG. 9 shows a schematic view of another modification of the invention in which an auxiliary instrumentation system is encompassed by a transparent inflatable unit.

The visual assurance system shown in FIG. 9 is adapted to be used with or without a visual assurance unit deployed between the windshield W and the glareshield G, since this system relies heavily on supplemental electronic display units that together would essentially obviate the need for a windshield unit. Accordingly, we will describe this system without a windshield unit. The system then consists of two visual assurance units, the hood unit 108 and the unit 110 containing the optical display devices. The unit 110 may be sealingly connected to the hood 108 similarly as the hood 82 is connected to the chamber 90 in the modification of FIG. 8, with open communication between the chambers so that a common oxygen supply as at 112 may be used to inflate both units and to supply life support to the pilot. They may also be completely separate units inflated by separate sources of inflation gas and being held together after inflation by Velcro ® means as already hereinabove described.

This system also has a HUD computer/electronics unit 114 with a HUD controller 115 attached thereto and having control buttons 116 for operation by the pilot P. The upper portion of the visual assurance unit 110 is formed of fairly sturdy plastic material. However, the lower portion of this unit, and especially the underside thereof, is made of very soft and pliable transparent plastic material. Thus, it can be closely fitted over the glareshield G, the HUD display 118 and the HUD control button panel 116, and thereafter Velcroed to the HUD controller 115. Because of the very soft and pliable nature of the underside of the unit 110 the pilot may readily have access to the HUD control buttons 116. Alternatively, the pilot could release a Velcro fastener, then pull the underside of the unit 110 slightly away from the control buttons and move a finger directly onto the appropriate control button. However, if other configurations of a HUD and glareshield will permit, the lower portion of the chamber 90 could be either partly or fully custom fitted to such features using a firmer transparent plastic material for all or part of the lower portion of the chamber 90.

In addition to the HUD optical display 118 the visual assurance unit 110 has directly mounted inside its upper front membrane three other visual displays, only two of which are shown. The first of these is a HUD flat panel LCD display 120. The second of these other displays is a HUD flat panel LED display 122. The third other display (not shown) is a Miniature Video Monitor Display which displays instantly transmitted images taken by a video camera (also not shown) mounted in the nose of the aircraft so as to take instant video movies of the view that could have been seen by the pilot P through the windshield had not smoke obscured such view by its presence between the windshield W and the visual assurance unit 110.

Accordingly, the system of FIG. 9, by means of the clear path of visibility to these various displays, and the controls therefore, maintained by the visual assurance units 108 and 110, provides a visual assurance system which is completely based on visual assurance to auxiliary sources of visual information that approximates ideal piloting conditions despite the fact that the cockpit C of the aircraft is otherwise filled with dense smoke.

FIG. 10

Figure 10:
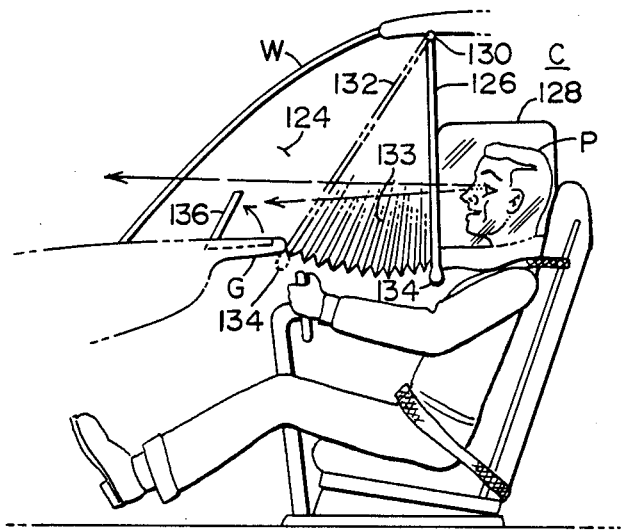
FIG. 10 shows a schematic view of another modification of the invention showing a non-inflated system.

FIG. 10 illustrates a non-inflated, or manually operated, version of the invention, utilizing an expandable chamber visual assurance unit 124 having a rigid or semi-rigid contact surface 126 for interfacing with a pilot's visual assurance hood 128.

The contact surface 126 may be made of glass or a suitable rigid plastic, or a semi-rigid plastic, as desired. The contact surface 126 is pivotally connected at 130 to a hinge-pin (not shown) that runs transverse of the cockpit C at the top of the windshield W. The contact surface 126 may be somewhat vertically and or horizontally curved as desired. However, the side edges of the contact surface 128 are preferably straight so as to make straight-line contact with structural members (not shown) along the sides of the cockpit C that frame the windshield W along the dotted line 132, which defines the position of the side edges of the contact surface 126 in the non-emergency configuration of the expandable chamber visual assurance unit 124. Transparent soft and pliable plastic shroud material 133 which is pleated or otherwise adapted for expansion, is sealingly attached to the vertical edges of the contact surface 126, the vertical windshield framing members along the line 132, and across the bottoms of the contact surface 126 and the glareshield G, to completely seal the visual assurance chamber unit 124. At some convenient point along the bottom of the contact surface 126 a handle 134 is attached for extension and retraction of the contact surface by the pilot P into emergency and non-emergency positions.

An auxiliary pop-up HUD display unit 136 may be mounted in the upper surface of the glareshield G for protection within the totally sealed environment of the visual assurance unit 124. The HUD display unit 136 furthermore may be either manually or automatically deployed by known spring and cam means (not shown).

Accordingly, in this form of the invention both the windshield W and the auxiliary HUD display unit 136 are at all times totally enveloped within and protected by the visual assurance unit from emergency conditions of smoke and/or particulate matter in both the emergency and non-emergency positions of said visual assurance unit 124.

FIG. 11

Figure 11:
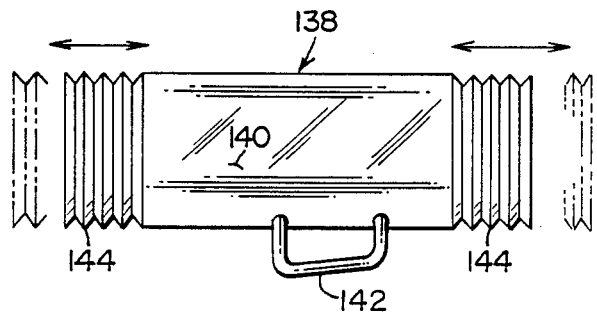
FIG. 11 shows a modified form of hand-held visual assurance unit the ends of which are made of resilient material for ready expansion to cover a range of different effective lengths responsive to various inflation pressures.

The modified form of hand-held visual assurance unit 138 shown in FIG. 11 was developed to satisfy a number of various needs with a single standard unit.

The configuration and size of aircraft cockpits vary substantially as do the compliments of instrumentation. For smaller non-pressurized aircraft the problem is less pronounced than in high performance high altitude transport carriers. Inevitably, therefore, there are different designs and configurations of this invention which are more suitable for one aircraft than for another, i.e., a small hand-held unit may be all that is required in some aircraft, whereas a built-in system, perhaps even incorporating the use of small hand-held units, may be suitable for other aircraft types. It is for such use that the device of FIG. 11 is adapted.

The hand-held unit 138 comprises a central section 140 of a relative sturdy and nonstretchable transparent plastic material and is preferably round in cross section, although it may be made in other shapes. The unit 138 is provided with a handle means 142 which may be hollow and communicating with the interior of the section 130, so that both may be inflated together, or the handle 142 may be of a solid material and suitably attached to the section 140. At either or both ends of the unit 138 there may be attached end chambers 144 which are in open communication with the central section 140 of the device. These end chambers 144 are made of transparent plastic or other materials which are very elastic and expandable so that the hand-held visual assurance device 138 can be used either by itself to provide the total path of visibility between a pilot P and a source of his necessary emergency visual information, or together with other visual assurance units, to precisely bridge the gap between such units in a visual assurance system such as shown in FIG. 7.

The end chambers 144 are shown as being accordian pleated. This is a common design for expandable chambers. They may also be reinforced with coiled wires (not shown) for shape retaining purposes. However, they may be of any material or construction which suits the purposes herein stated. The unit 138, like all of the separate visual assurance units disclosed in this application, may, and should, have its own means of inflation and pressure control, as already mentioned hereinabove.

In the discussion of THE FIELD OF INVENTION above, it has already been pointed out that it is contemplated that this invention can be used by a diver accessing material under water. It is considered significant in this regard to point out that the visual assurance unit 138 shown in FIG. 11 is especially adaptable to such a use in murky, turbid and brackish water. In such a use the visual assurance unit 138 will contain a clear fluid such as clean fresh water to provide a clear path of visibility between the diver operator and the material being visually accessed. Since the visual assurance unit 138 is adjustable in length it may be filled with water to the extent of eye focus distance required by the operator.

FIG. 12

In FIG. 12 the hood 146, which is of a sturdy transparent plastic material, has integrally attached thereto a main snout section 148 which is in open communication with the interior of the hood 146. The main snout section 148 is also constructed of a sturdy transparent plastic material for contributing to the stability of the combined unit 146, 148 after inflation. The end of the main snout section 148 remote from the hood 146 has attached thereto a chamber 150 made of highly elastic material, which is in open communication with the main snout section 148. Underneath the main section of the snout 148 there is attached a handle 152 so that the snout 148, 150 can be supported by the pilot P to enhance the operative stability of the combined hood and snout unit 146, 148, 150. This is especially desirable during the placement of the combined unit 146, 148, 150 over the head of the pilot P and against the desired source of visual information, which in this case is shown to be a HUD display unit 154. For further details of the elastic chamber 150, reference is made to the discussion of the similar elastic chamber 144 in regard to FIG. 11. In regard to operational use of this modification, and to suggest further potential utility for this form of combined hood/snout unit 146, 148, 150, reference is made to FIG. 7 and the discussion relative thereto, hereinabove.

FIGS. 13 and 14

In FIG. 13 there is shown a modified form of an automatically deployable visual assurance unit 156 which is mounted over and around the instrument panel X of an aircraft below the glareshield G. In this stored position of the visual assurance unit 156 the end of the unit which is to be extended by inflation is tightly smoothed over the instrument panel X and the soft pliable sides of the unit are rolled up or otherwise stored around the instrument panel X as shown at 158 where the other end of the unit is sealed around the instrument panel X. A source of inflating gas (not shown) may be connected behind the instrument panel X to communicate into the space between the instrument panel X and the interior surface of the film membrane of the visual assurance unit 156 that passes over the instrument panel X, for inflating the unit 156 away from the instrument panel X. Or the source of inflating gas may be connected in any appropriate way to the outside of the visual assurance unit 156 so as to communicate with the space between the unit 156 and the instrument panel X. The visual assurance unit 156 may be manually inflated and deployed, or automatically, as discussed relative to other forms of visual assurance units above.

FIG. 14 shows the visual assurance unit 156 of FIG. 13 deployed against the goggles 160 of the pilot P. The visual assurance system shown in the cockpit C of FIG. 14 also includes an automatically deployed visual assurance unit 162 which is deployed from a stored position on the ceiling 164 of the cockpit C into the space between the windshield W and the glareshield G of the aircraft.

FIGS. 13 and 14 illustrate another form of visual assurance system according to the invention wherein a pilot's eye goggles, a visual assurance unit which is sealed over the instrument panel, and a windshield visual assurance unit comprise together the clear path of visibility for the pilot under emergency conditions of heavy smoke and/or particulate matter invading the cockpit of the aircraft. Most significantly in this modification of the invention, the whole instrument panel X is totally enveloped within and protected by the visual assurance unit 156 in both the stored and deployed positions of the visual assurance unit 156.

FIGS. 15 and 16

FIGS. 15 and 16 show a cylindrical hand-held visual assurance unit 166 similar in most respects to the other hand-held units already described, except that this unit employs separate chambers which are respectively inflated by high pressure and low pressure inflating gases.

The hand-held visual assurance unit 166 shown in FIGS. 15 and 16 is constructed in the following manner. To begin with the working chamber of the device is the low pressure chamber 170 which is also labeled LP (for convenience) on the drawing. The high pressure chamber 168, also designated HP on the drawing (for convenience), is merely for reinforcing the low pressure chamber 170 so that the basic desired shape of the low pressure chamber 170 will be maintained.

The high pressure chamber 168 shown in FIG. 15 is in the form of a hollow sealed sleeve which surrounds the core 172 of the low pressure chamber 170. At both ends of the core 172 of the low pressure chamber 170 the chamber flares out into circular disc-like chambers 174. The high pressure chamber 168 is completely constructed of sturdy essentially non-stretchable transparent plastic material. On the other hand, the low pressure chamber 170, 172 is completely constructed of very soft, pliable, and sensitively expansible transparent plastic material. The chambers 168 and 170 may be adhesively connected or not, as desired, in any known manner. The unit 166 is also supplied with a handle 176 connected to the high pressure chamber 168, and each of the chambers 168 and 170 has a filling valve and a relief valve (which are not shown). The high pressure source can be used to maintain a certain rigidity to the handle 176.

In operation of the device of FIGS. 15 and 16, the high pressure chamber 168 is first filled from a separate source of regulated high pressure inflating gas (not shown) to a pressure sufficient for the high pressure chamber 168 to reinforcedly support the low pressure chamber 170. Then the low pressure chamber 170 is filled from a separate source of regulated low pressure inflating gas (not shown), or from an overflow valve from the high pressure chamber 168 such as valve 175, to a pressure that will allow the outer surfaces of the disc-like chambers 174 to very closely conform to the shape, including any irregularities thereon, of whatever element or unit in the assured path of visibility of this invention the low pressure chamber 170 is required to contact. If an overflow valve such as 175 is used to fill the low pressure chamber 170, a relief valve such as 177 is used to obtain the desired low pressure in chamber 170.

FIGS. 17 and 18

The visual assurance unit 178 shown in FIGS. 17 and 18 operates similarly to the device of FIGS. 15 and 16 but is of different construction more suited to use as an instrument panel visual assurance unit for positioning similar to that of the visual assurance unit 156 shown in FIG. 14. The visual assurance unit 178 comprises a single low pressure chamber 179 (designated LP on the drawing for convenience) which tapers from the operator end 180 thereof convergingly toward the instrument panel end 182 thereof. The visual assurance unit 178 also has a multiplicity of high pressure chambers 184 (designated HP on the drawing for convenience) which are firmly secured by adhesive, or otherwise, to the converging sides of the low pressure chamber 179. The high pressure chambers 184 may be tapered as shown for efficiency and cost saving. Flexible inflating gas hoses 185 are connected between successive high pressure chambers and are in open communication with them so that all of the high pressure chambers 184 can be inflated at the same time. One of the short sections of flexible inflating gas hoses 185 has a filling valve (not shown) which can be connected to a separate source of regulated high pressure inflation gas (also not shown) for inflating all of the high pressure chambers 184 simultaneously to the desired pressure. Similarly, the low pressure chamber 179 has a filling valve (also not shown) for connection to a source of regulated low pressure inflation gas (also not shown) for inflation of the low pressure chamber 179 to an appropriate pressure.

The material of which the high pressure chambers 184 are made will be similar to the material of which the high pressure chamber 168 shown in FIG. 15 is made. However, it is contemplated that instead of using inflatable high pressure chambers such as 184 for reinforcedly supporting the low pressure chamber 179, appropriate lengths and/or configurations of any appropriate rigid or semi rigid, hollow or solid, material (not shown) may be used to reinforcedly support the low pressure chamber 179. The material of which the low pressure chamber 179 is made is similar to the material of which the low pressure chamber 170 shown in FIG. 15 is made. Accordingly, reference is made to the discussion of FIGS. 15 and 16 in regard to the materials of which the high pressure chambers 184 and the low pressure chamber 179 of FIGS. 17 and 18 are made.

An additional feature of the invention is shown in FIG. 18 of the drawings. The tapering of the side walls of the low pressure chamber 179 provides the opportunity for placing printed material such as that shown at 186 in FIG. 18, concerning emergency operating procedures, on the inside faces of the converging side walls 188 of the low pressure chamber 179, so that when visual assurance unit 178 is positioned in the space between a source of visual information and the pilot, the printed material will be viewable by the pilot in the clear path of visibility provided by the visual assurance unit 178.

FIG. 19

FIG. 19 shows another modification of a hand-held visual assurance unit 190. This unit has a single central chamber 192 which is cylindrical in shape and is supplied with a handle 194 similar to those of other versions of hand-held units that have already been described. The chamber 192 is formed of a rather sturdy and non-stretchable transparent plastic material so that when it is inflated it will have good shape keeping qualities and stability. To each end of the single chamber 192 there is attached, as by an adhesive or otherwise, a ring 196 of soft and pliable foam rubber, or like material, which can closely conform to the surface of a source of visual information or the operator's visage, or another visual assurance unit in a chain of visual assurance units. Furthermore, the depth of the foam rubber rings 196, as depicted on FIG. 19 by the distance between the lines BB and B'B' and lines CC and C'C', will allow the open centers 197 of the rings 196 to span protruding objects, such as knobs, etc., that may be on the surfaces to be contacted by the hand-held unit 190.

FIG. 20

FIG. 20 shows another arrangement of visual assurance units especially suited for use in built-in systems of aircraft having a cockpit C such as shown in this Figure. In this arrangement the pilot P is wearing a visual assurance hood 198. A second visual assurance unit 200 is shown to have been automatically deployed out of the storage compartment 202 located in the top of the glareshield G and into the space between the windshield W and the glareshield G, and extending back into contact with the pilot's hood unit 198. A third visual assurance unit 204 is shown to have been automatically deployed from a second storage compartment 206 located in the underside of the glareshield G and extending back into the space between the instrument panel X and the lower portion of the pilot's hood unit 198. The lower or instrument panel visual assurance unit 204 may preferably be constructed with high pressure and low pressure chambers similar to the device shown in FIGS. 17 and 18. All three units in FIG. 20 may further be supported and secured together by Velcro ® straps 208 and pads 210, such as have been previously discussed.

While the numerous embodiments hereinabove described all specifically pertain to and are described in connection with uses of the invention wherein the individual work stations are cockpits of aircraft, it is to be understood that the invention may equally be advantageously used in other cockpit-type work stations such as the cabs of fire fighting vehicles, army tanks, gun turrets for use by ground, sea and air forces, in the pilot house or room on an ocean going ship or submarine, an air traffic controller station at an airport, or any other cab-in-type work station where the monitoring of visual gauges or instruments is vital to maintain continued effective and/or safe operation of the equipment despite emergency conditions of vision impeding fluids, vapors, and/or particulate matter.

It is to be additionally understood that use of this invention is not limited to cockpit or cabin-type work stations, since the invention also can readily be used at work stations out in the open where uninterrupted access to operationally necessary visual information such as is displayed on pressure gauges, indexing controls, etc., is necessary for the safe, secure and successful completion of operational procedures, after such visual display information might become obscured by emergency conditions of vision impeding fluids, vapors, and/or particulate matter.

While this invention has been described as having preferred designs, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What I claim is:

1. An operator station emergency visual assurance system for providing the operator with substantially uninterrupted access to operationally necessary visual information under emergency conditions of a progressive invasion by heavy smoke and/or particulate matter toward and/or into the space between the source of said visual information and the operator, comprising:
    (a) a station
    (b) said station having a source of visual information
    (c) an operator position at said station spaced from said source of visual information,
    (d) movable structural positionable means for providing a clear path of visibility between said source of visual information and said operator when in said operator position; and
    (e) said positionable means comprising a container which is movable between said operator and said source of visual information and operable to completely fill the visual path between said operator and said source of visual information.

2. An operator station assembly visual assurance system as in claim 1, including:
    (a) life support means for said operator associated with said operator position.

3. An operator station emergency visual assurance system as in claim 1, wherein:
    (a) said positionable means is transparent.

4. An operator station emergency visual assurance system as in claim 3, wherein:
    (a) said transparent positionable means is deformable.

5. An operator station emergency visual assurance system as in claim 3, wherein:
    (a) said transparent positionable means is inflatable.

6. An operator station emergency visual assurance system as in claim 3, wherein:
    (a) said transparent positionable means is expandable.

7. An operator station emergency visual assurance system as in claim 3, wherein:
    (a) said transparent positionable means is manually operable.

8. An operator station emergency visual assurance system as in claim 7, wherein:
    (a) said transparent positionable means comprises an expandable enclosed space which is operable to completely fill the visual path between the operator and said source of visual information.

9. An operator station emergency visual assurance system as in claim 7, wherein:
    (a) said transparent positionable means comprises an inflatable bag-like enclosed space means which is operable to completely fill the visual path between the operator and said source of visual information.

10. An operator station emergency visual assurance system as in claim 9, wherein:
    (a) said inflatable bag-like enclosed space means is enclosed by a resilient and deformable material which adapts it to fill visual paths of a range of distances and to intimately engage transparent window means over the source of the visual information responsive to various inflation pressures.

11. An operator station emergency visual assurance system as in claim 10, wherein:
    (a) said inflatable bag-like enclosed space with the inner space of an attached inflatable helmet portion which is adapted to be hand fitted over the operator's head and in sealing relationship to the operator's upper body by the operator.

12. An operator station emergency visual assurance system as in claim 11, including:
    (a) life support means for the operator mounted on and communicating with the interior of said helmet portion.

13. An operator station emergency visual assurance system as in claim 9, including:

(a) life support means for the operator separate from and outside said inflatable bag-like enclosed space means.

14. An operator station emergency visual assurance system as in claim 13, wherein:
(a) said life support means comprises a separate inflatable helmet which is adapted to be hand-fitted over the operator's head and in sealing relationship to the operator's upper body by the operator, and in which that portion of the helmet surface which faces toward the source of the visual information is sufficiently elastic to enable it to closely engage said inflatable bag-like enclosed space means, so that said inflatable bag-like enclosed space means and said separate inflatable helmet together comprise said clear path of visibility between said source of visual information and the operator.

15. An operator station emergency visual assurance system as in claim 1, wherein:
(a) said positionable means having an emergency operative-deployed position and a non-emergency inoperative stored position
(b) means for storing said positionable means in said inoperative position during non-emergency conditions, and
(c) means for deploying said positionable means from said stored position to said operative position when said emergency conditions occur.

16. An operator station emergency visual assurance system as in claim 15, wherein:
(a) said positionable means is transparent.

17. An operator station emergency visual assurance system as in claim 16, wherein:
(a) said positionable means comprises movable means mounted in stored position at the operator station and adapted to be deployed so as to completely fill the visual path between the operator and said source of visual information.

18. An operator station emergency visual assurance system as in claim 17, wherein:
(a) said movable means in its stored position is mounted over the said source of visual information and is sealed about the periphery of the said source of visual information so that said visual information is totally enveloped within and protected by said movable means from said emergency conditions of smoke and/or particulate matter in both the stored and deployed positions of said positionable means.

19. An operator station emergency visual assurance system as in claim 18, wherein:
(a) said movable means comprises at least one separate section which is expandable.

20. An operator station emergency visual assurance system as in claim 18, wherein:
(a) said section which is expandable is manually operable.

21. An operator station emergency visual assurance system as in claim 17, wherein:
(a) said movable means comprises at least one separate section which is inflatable.

22. An operator station emergency visual assurance system as in claim 17, wherein:
(a) said movable means comprises at least two separate sections which are inflatable, each of said inflatable sections having a contact surface which is adapted to face and to contact the contact surface of the other section along a common plane generally transverse to the said visual path between the said source of visual information and the operator when the said two separate sections are inflated.

23. An operator station emergency visual assurance system as in claim 22, wherein:
(a) one of the said two separate inflatable sections of said movable means comprises a hood means which is adapted to be sealed about the upper body of the operator, and
(b) said hood means having connected thereto life support means for said operator.

24. An operator station emergency visual assurance system as in claim 23, wherein:
(a) the other of the said two separate inflatable sections of said movable means comprises a hand held unit.

25. An operator station emergency visual assurance system as in claim 17, wherein:
(a) said movable means comprises at least three separate sections which are inflatable in series so that each section comprises a part of said clear visual path between the said source of visual information and the operator.

26. An operator station emergency visual assurance system as in claim 25, wherein:
(a) one of the said three separate inflatable sections of said movable means comprises a hood means which is adapted to be sealed about the upper body of the operator, and
(b) said hood means having connected thereto life support means for said operator.

27. An operator station emergency visual assurance system as in claim 26, wherein:
(a) a second of the said three separate inflatable sections of said movable means is mounted in close proximity to said source of visual information and is sized and configured such that, when inflated, it will be directed toward the said source of visual information to first displace all vision obstructing smoke and/or particulate matter from the said visual path between the said source of visual information and the operator and, thereafter, to seal against said source of visual information, thereby assuring a clear path of visibility to the said source of visual information through said second separate inflatable section of said movable means.

28. An operator station emergency visual assurance system as in claim 27, wherein:
(a) the third of the said three separate inflatable sections of said movable means comprises a hand-held unit which, when inflated, bridges the space between the said first operator hood inflatable section and the second visual information source sealing inflatable section, thereby assuring a clear path of visibility between the said source of visual information and the operator.

29. An operator station emergency visual assurance system as in claim 15, including:
(a) normally stored auxiliary backup instrument means associated with said positionable means
(b) said auxiliary backup instrument means being adapted to be deployed simultaneously with said positionable means and so as to be within the confines of the clear path of visibility provided by said positionable means, and
(c) said positionable means and said auxiliary backup instrument means being so associated with one another that, when both said means are deployed, said positionable means precludes all vision obstructing smoke and/or particulate matter from the visual path between the operator and said-auxiliary backup instrument means.

30. An operator station emergency visual assurance system as in claim 15, including:
   (a) fixed position auxiliary backup instrument means associated with said positionable means
   (b) said auxiliary backup instrument means being mounted within the confines of the clear path of visibility provided by said positionable means, and
   (c) said positionable means and said auxiliary backup instrument means being so associated with one another that said positionable means when deployed precludes all vision obstructing smoke and/or particulate matter from the visual path between the operator and said auxiliary backup instrument means.

31. An operator station emergency visual assurance system as in claim 2, wherein:
   (a) said life support means for said operator comprises conventional separate face sealing eye goggle and clean breathing gas mask means such as worn by aviators in unpressurized cockpit conditions.

32. An operator station emergency visual assurance system as in claim 2, wherein:
   (a) said life support means includes operator eye shielding means, and
   (b) said positionable means includes a collapsible chamber having a transparent movable contact surface for engagement with said operator eye shielding means.

33. An operator station emergency visual assurance system as in claim 32, wherein:
   (a) said contact surface is substantially rigid, and
   (b) said collapsible chamber includes pivot means for pivoting said transparent rigid contact surface of said collapsible chamber into engagement and out of engagement with said eye shielding means.

34. An operator station emergency visual assurance system as in claim 1, including:
   (a) automatic sensing means for sensing the onset of said emergency conditions, and
   (b) signaling means associated with said sensing means for signaling the operator of the onset of said emergency conditions, whereby the operator is notified of the necessity to position said positionable means in the space between said source of visual information and the said operator position.

35. An operator station emergency visual assurance system as in claim 15, including:
   (a) automatic sensing means for sensing the onset of said emergency conditions, and
   (b) automatic deploying means associated with said sensing means for automatically deploying said positionable means from said storage means into the space between said source of visual information and said operator position responsive to a sensing by said sensing means of the onset of said emergency conditions.

36. An operator station emergency visual assurance system as in claim 1, including:
   (a) auxiliary light means which is so associated with said positionable means that when said positionable means is positioned in the space between said source of visual information and the operator said auxiliary light means illuminates said source of visual information.

37. An operator station emergency visual assurance system as in claim 1, including:
   (a) printed material means concerning operator emergency procedures, said printed material means being so associated with said positionable means that when said positionable means is positioned in the space between said source of visual information and the operator said printed material means will be viewable in said clear path of visibility.

38. An operator station emergency visual assurance system as in claim 5, wherein:
   (a) said inflatable transparent positionable means comprises multiple chamber means
   (b) at least one of said multiple chamber means being a low pressure chamber means made of soft pliable material for making close sealing contact with, over and around the source of visual information and/or the visage of the operator and/or another low pressure chamber means of said positionable means
   (c) a source of low pressure inflating gas connectable to said low pressure sealing contact chamber means
   (d) at least one other of said multiple chamber means being a high pressure chamber means made of high strength low-stretch material fixed to said low pressure chamber means for providing form reinforcing support for said low pressure chamber means
   (e) a source of high pressure inflating gas connectable to said high pressure form reinforcing chamber means, and
   (f) whereby upon inflation of said low pressure and said high pressure chamber means by their respective sources of inflation gas, when the said positionable means is positioned between said source of visual information and said operator, the said high pressure chamber means will reinforcingly support the said low pressure chamber means in its desired form and position while the low pressure chamber means makes and maintains close sealing contact with, over and around the said source of visual information and/or the visage of the operator and/or another low pressure chamber means of said positionable means.

39. An operator station emergency visual assurance system as in claim 3, wherein:
   (a) said positionable means being provided at its point of contact with said source of visual information and/or the visage of said operator with a peripheral closed loop means of a compliant springy material, fixed on said positionable means about the periphery of said clear path of visibility, for sealing with, over and around irregularities on the surface of the said source of visual information and/or visage of said operator.

40. An operator station emergency visual assurance method, for use at a station including a source of operationally necessary visual information and an operator position spaced from said source of visual information, and for assuring said operator substantially uninterrupted access to said source of visual information under emergency conditions of a progressive invasion by heavy smoke and/or particulate matter toward and/or into the space between the said source of visual information and the operator, comprising the steps of:
   (a) providing a positionable clear path of visibility means having a container movable between said operator and said source of visual information enabling it to completely fill such of the space between said source of visual information and said operator as includes the visual path between said source of visual information and the operator, (b) positioning said positionable means in the space between said source of visual information and the operator, and (c) thereby preempting and/or displacing any smoke and/or particulate matter from said visual path and thus assuring the provision of a clear path of visibility between said source of visual information and said operator under such emergency conditions.

41. In a work station area which includes an operator position and visual acquisition material for said operator which is spaced from said operator position, the method for providing clear visibility between said operator and said acquisition material when vision impeding fluids, vapors, and/or particulate matter interpose in the space between the operator and the visual acquisition material which includes the steps of:

(a) inserting into the space between said operator and said acquisition material a container for excluding said vision impeding fluids, vapors, and/or particulate matter, (b) providing light transmitting means from said operator to said acquisition material in said inserted container, and (c) thereby maintaining said operator's visibility to said acquisition material at all times when said vision impeding fluids, vapors and/or particulate matter are present in said work station area.

42. An operator station emergency visual assurance method as in claim 40, and including:

(a) providing life support means for said operator.

43. An operator station emergency visual assurance method as in claim 40, and including:

(a) providing transparent positionable means.

44. An operator station emergency visual assurance method as in claim 43, and including:

(a) providing deformable positionable means.

45. An operator station emergency visual assurance method as in claim 44, and including:

(a) providing expansible positionable means.

46. An operator station emergency visual assurance method as in claim 45, and including:

(a) providing inflatable positionable means.

47. An operator station emergency visual assurance method as in claim 45, and including:

(a) manually expanding said positionable means.

48. An operator station emergency visual assurance method as in claim 46, and including:

(a) manually positioning said positionable means.

49. An operator station emergency visual assurance method as in claim 46, and including:

(a) providing elastic inflatable positionable means, and (b) expanding and contracting said elastic inflatable positionable means to compensate for different distances of the operator from said source of visual information.

50. An operator station emergency visual assurance method as in claim 49, and including:

(a) stretching that portion of said positionable means which is on the source of visual information side thereof.

51. An operator station emergency visual assurance method as in claim 50, and including:

(a) providing life support means for said operator.

52. An operator station emergency visual assurance method as in claim 40, and including:

(a) sensing the onset of said emergency conditions, (b) signalling said operator that the onset of said emergency conditions has been sensed, and (c) thereby notifying the operator of the necessity to position said positionable means in the space between said source of visual information and the said operator position.

53. An operator station emergency visual assurance method as in claim 40, and including:

(a) providing storage means for storing said positionable means in an inoperative position during non-emergency conditions, and (b) storing said positionable means in said storage means during non-emergency conditions.

54. An operator station emergency visual assurance method as in claim 53, and including:

(a) causing said positionable means to automatically deploy from said storage means into the space between said source of visual information and the operator, and to fill said space, responsive to a sensing of the onset of said emergency conditions.

55. An operator station emergency visual assurance method as in claim 54, and including:

(a) providing inflatable positionable means, (b) deploying and automatically inflating said inflatable positionable means, and (c) filling the space between said source of visual information and the operator with said inflatable positionable means.

56. An operator station emergency visual assurance method as in claim 55, and including:

(a) sealing at least part of said inflatable positionable means over and about the edges of said source of visual information.

57. An operator station emergency visual assurance method as in claim 55, and including:

(a) sealing at least a part of said inflatable positionable means about the upper body of the operator.

58. An operator station emergency visual assurance method as in claim 57, and including:

(a) providing life support means for said operator.

59. An operator station emergency visual assurance method as in claim 53, and including:

(a) providing inflatable positionable means, (b) causing portions of said inflatable positionable means to automatically deploy from said storage means into the space between said source of visual information and the operator responsive to a sensing of the onset of said emergency conditions, and (c) hand deploying another portion of said inflatable positionable means from said storage means into the space between said source of visual information and the operator so that said hand deployed portion and said automatically deployed portions of said inflatable positionable means together constitute said clear visual path between said source of visual information and said operator.

60. An operator station emergency visual assurance method as in claim 40, and including:

(a) providing auxiliary backup instrument means for said source of visual information, and (b) positioning said auxiliary backup instrument means within the confines of said clear path of visibility.

61. An operator station emergency visual assurance method as in claim 40, and including:

(a) providing auxiliary light means associated with said positionable clear path of visibility means, and
(b) illuminating the said source of visual information with said auxiliary light means.

62. An operator station emergency visual assurance method as in claim 40, and including:
(a) providing printed material means concerning emergency procedures in association with said positionable clear path of visibility means, and
(b) locating said printed material means in relationship to said positionable clear path of visibility means so that said printed material means will be viewable by the operator in the said clear path of visibility when the said positionable clear path of visibility means is positioned in the space between said source of visual information and the operator.

63. An operator station emergency visual assurance method as in claim 46, and including:
(a) providing inflatable positionable means having multiple separately sealed chamber means which are physically connected, but not inflatably connected, to one another, at least one of said chamber means being made of soft pliable material and having a contact surface means, and at least one other of said chamber means being made of high strength low-stretch material,
(b) inflating said soft pliable chamber means with low pressure inflating gas so that the contact surface means thereof will make close sealing contact with, over and around the source of visual information and/or the visage of the operator when said inflatable positionable means is positioned in the space between said source of visual information and the operator, and
(c) inflating said high strength low-stretch chamber means with high pressure inflating gas so that said high strength low-stretch chamber means will provide form reinforcing support for said low pressure soft pliable chamber means when said inflatable means is positioned in the space between said source of visual information and the operator.

64. An operator station emergency visual assurance method as in claim 49, and including:
(a) fixing on said elastic inflatable positionable means, at its point of contact with said source of visual information and/or the visage of said operator, and about the periphery of said clear path of visibility, a peripheral closed loop means of compliant springy material for sealing over and around irregularities on the surface of the said source of visual information and/or the visage of said operator.

65. An operator station emergency visual assurance system as in claim 5, wherein:
(a) said inflatable transparent positionable means comprises inflatable chamber means;
(b) said inflatable chamber means comprising at least one low pressure chamber means made of soft pliable material for making close sealing contact with, over and around the source of visual information and/or the visage of the operator and/or another low pressure chamber means of said positionable means;
(c) a source of low pressure inflating gas connectable to said low pressure sealing contact chamber means;
(d) form and position reinforcing means fixed to said low pressure sealing contact chamber means for providing form and position reinforcing support for said low pressure sealing contact chamber means, and
(e) whereby upon inflation of said low pressure sealing contact chamber means by said source of low pressure inflating gas, when the said positionable means is positioned between said source of visual information and said operator, the said form and position reinforcing means will reinforcingly support the said low pressure chamber means in its desired form and position while the low pressure chamber means makes and maintains close sealing contact with, over and around the said source of visual information and/or the visage of the operator and/or another low pressure chamber means of said positionable means.

66. An operator station emergency visual assurance system as in claim 65, wherein:
(a) said form and position reinforcing means comprises at least one length of rigid material.

67. An operator station emergency visual assurance system as in claim 65, wherein:
(a) said form and position reinforcing means comprises at least one length of semi-rigid material.

68. An operator station emergency visual assurance system as in claim 65, wherein:
(a) said form and position reinforcing means comprises at least one high pressure chamber means made of high strength low-stretch material;
(b) a source of high pressure inflating gas connectable to said high pressure chamber means, and
(c) whereby upon inflation of said high pressure chamber means by said source of high pressure inflating gas, the said high pressure chamber means will reinforcingly support the desired form and position of said low pressure sealing contact chamber means.

* * * * *